Nov. 6, 1928. 1,690,118

F. G. JULYAN

BATTERY CONNECTER

Filed May 21, 1926

Witness.
A. C. McKnight.

Inventor.
Fred G. Julyan.
by Burton & Burton
his Attorneys.

Patented Nov. 6, 1928.

1,690,118

UNITED STATES PATENT OFFICE.

FRED G. JULYAN, OF EUCLID, OHIO, ASSIGNOR TO AUTO MECHANICAL PRODUCTS COMPANY, OF CHICAGO, ILLINOIS, A CORPORATION OF ILLINOIS.

BATTERY CONNECTER.

Application filed May 21, 1926. Serial No. 110,645.

The purpose of this invention is to provide an electric conductor adapted to serve as a connecter or "jumper" for storage batteries and formed with special terminals rendering it both economical to produce and simple to apply or remove from a battery terminal. The invention consists of certain features of construction as herein shown and described and as indicated by the claims.

Storage batteries consisting of a small number of cells to each battery are frequently joined in series, especially for the operation of re-charging them, and to provide an efficient connecter which may be applied or removed with the least loss of time and injury to the battery terminals, I have found it desirable to make the connecter of a resilient construction. The batteries themselves are fairly heavy and will withstand a considerable force applied laterally without slipping upon a shelf or floor on which they rest; therefore, the resilient connecter may be inserted between the terminals of adjacent batteries so as to exert its yielding expansive force for securing good electrical contact with the terminals.

Figure 1:
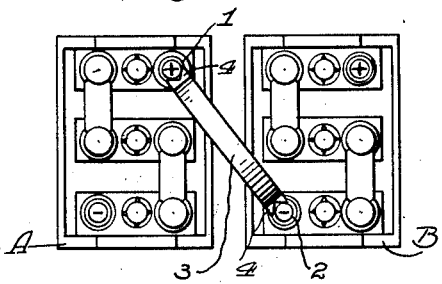
Figure 1 is a top plan view showing a pair of storage batteries connected by the "jumper" embodying this invention.
Figure 2:
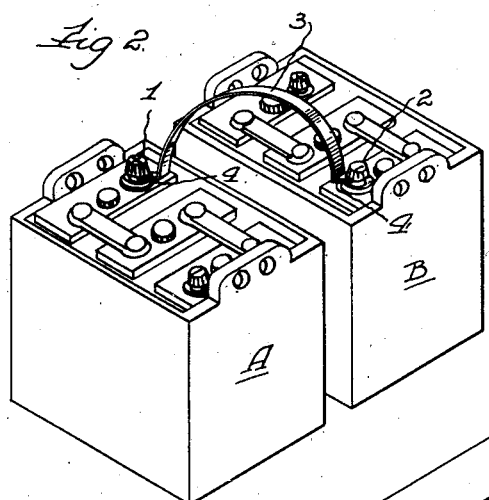
Figure 2 is a perspective view of the same showing the jumper approximately in side elevation.
Figure 3:
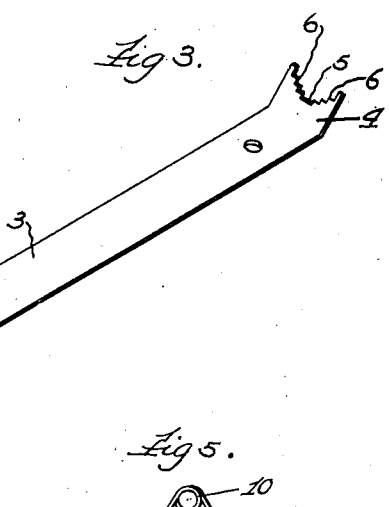
Figure 3 is a perspective view of the jumper itself.

As shown in Figure 1 the two batteries, A and B, of three cells each, are set side by side with the positive terminal, 1, of the battery, A, and the negative terminal, 2, of the battery, B, located at the mutually adjacent sides of the two batteries, though disposed at respectively opposite ends of the boxes. The jumper or connecter, 3, consists of a flat strip of resilient metal, preferably coated or plated with lead to avoid electrochemical action between its surface and the lead terminals, 1 and 2. Each end of the strip, 3, is bent up at about 45 degrees from the middle or body portion as indicated at 4 on Figure 3, so that when the middle portion of the strip, 3, is bowed or arched upwardly, as clearly shown in Figure 2, the end portions, 4, 4, will extend oppositely in the same plane. Each end is formed with a triangular notch at 5, and preferably the edges of these notches are made serrated or jagged so that the sharp serrations may be firmly impressed into the relatively soft surfaces of the terminals, 1 and 2, for securing good electrical contact therewith. No actual fastening of the jumper to the terminals, 1 and 2, is required as the resilience of the bowed middle portion, 3, will hold it in place; however, if the terminal includes a headed binding screw in convenient position, the notched ends, 4, may be slipped under the head of such binding screw and clamped thereby if desired.

Figure 4:
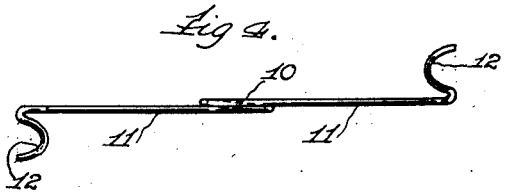
Figure 4 is a top plan view of a modified form of the invention.
Figure 5:
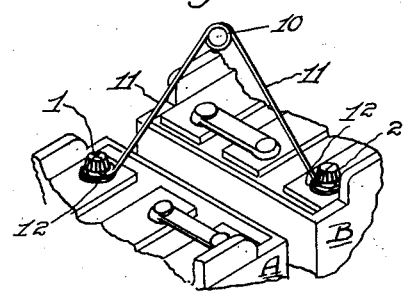
Figure 5 is a perspective view showing the method of applying said modified device.

As a modification of the foregoing, a wire jumper may be substituted as shown in Figures 4 and 5. For this form a piece of fairly resilient wire is bent into a single coil, 10, at about the middle of its length, with arms, 11, extending from opposite ends of the coil in angular relation to each other, say at about 90 degrees. The terminal of each of the arms, 11, is bent into an arcuate or hooked form at 12, so that the two terminal hooks, 12, 12, will lie in approximately the same plane with their curves opening oppositely and away from each other. By slightly closing the angle between the arms, 11, the connecter may be sprung into position between a pair of battery terminals, as indicated at 1 and 2, in Figure 5, and the resiliency of the material and its coil, 10, will hold them in good electrical contact with the terminals.

It will be seen that either form of the invention lends itself to quick application and almost instant removal, thus saving time as well as saving wear and tear on the battery terminals themselves.

I claim:—

1. The combination of a battery connecter comprising a flat resilient metal strip having notched ends with the notches opening oppositely and outwardly, and a pair of approximately parallel up-standing battery terminals engaged by said notches respectively, the resilient middle portion being bent out of the line connecting said terminals for exerting a yielding pressure through the notched ends against the terminals, and the end portions of the strip being initially bent away from the plane of the middle portion both at the same side of said plane, whereby they are substantially aligned in a common plane when the middle portion is bent.

2. A battery connecter comprising a resilient member of conducting material having a middle portion adapted to be bent in stressed condition out of a straight line connecting the ends of the member and end portions permanently bent with respect to the middle portion both from the same side thereof and formed with opposite and outwardly open recesses to partially embrace the respective terminals between which the connecter is interposed in said stressed condition.

In testimony whereof, I have hereunto set my hand at Cleveland, Ohio, this 14th day of May, 1926.

FRED G. JULYAN.